Feb. 6, 1968

S. A. SEYMOUR ETAL 3,367,520

SILO UNLOADER HAVING FRANGIBLE DRIVE COUPLING

Filed Aug. 24, 1966

INVENTOR.
SHAUN A. SEYMOUR
WILLIAM W. MANN

BY Walter V. Wright

Feb. 6, 1968  S. A. SEYMOUR ET AL  3,367,520
SILO UNLOADER HAVING FRANGIBLE DRIVE COUPLING
Filed Aug. 24, 1966  6 Sheets-Sheet 2
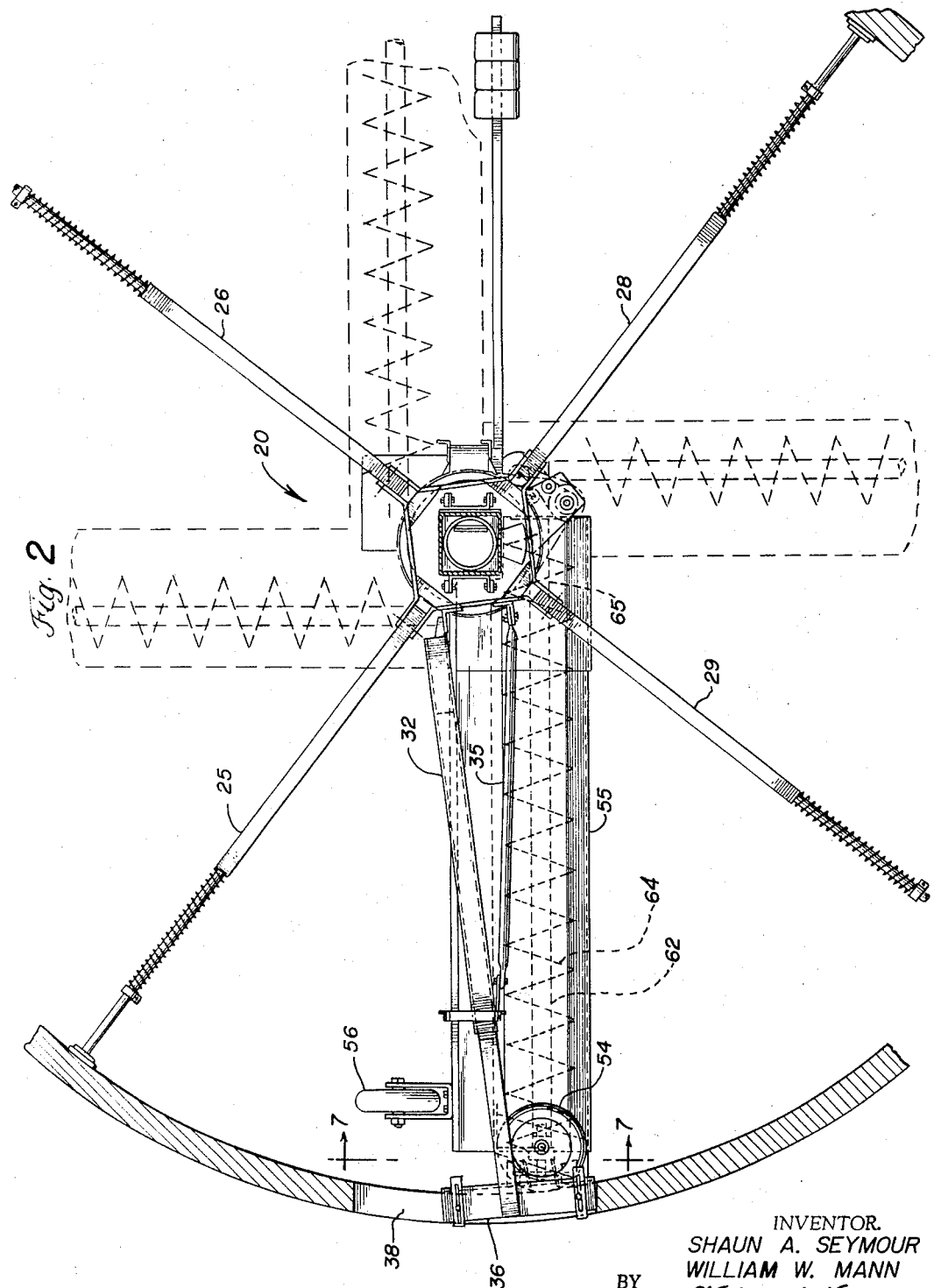
INVENTOR.
SHAUN A. SEYMOUR
WILLIAM W. MANN
BY
Walter V. Wright INVENTOR.
SHAUN A. SEYMOUR
WILLIAM W. MANN
BY Walter V. Wright

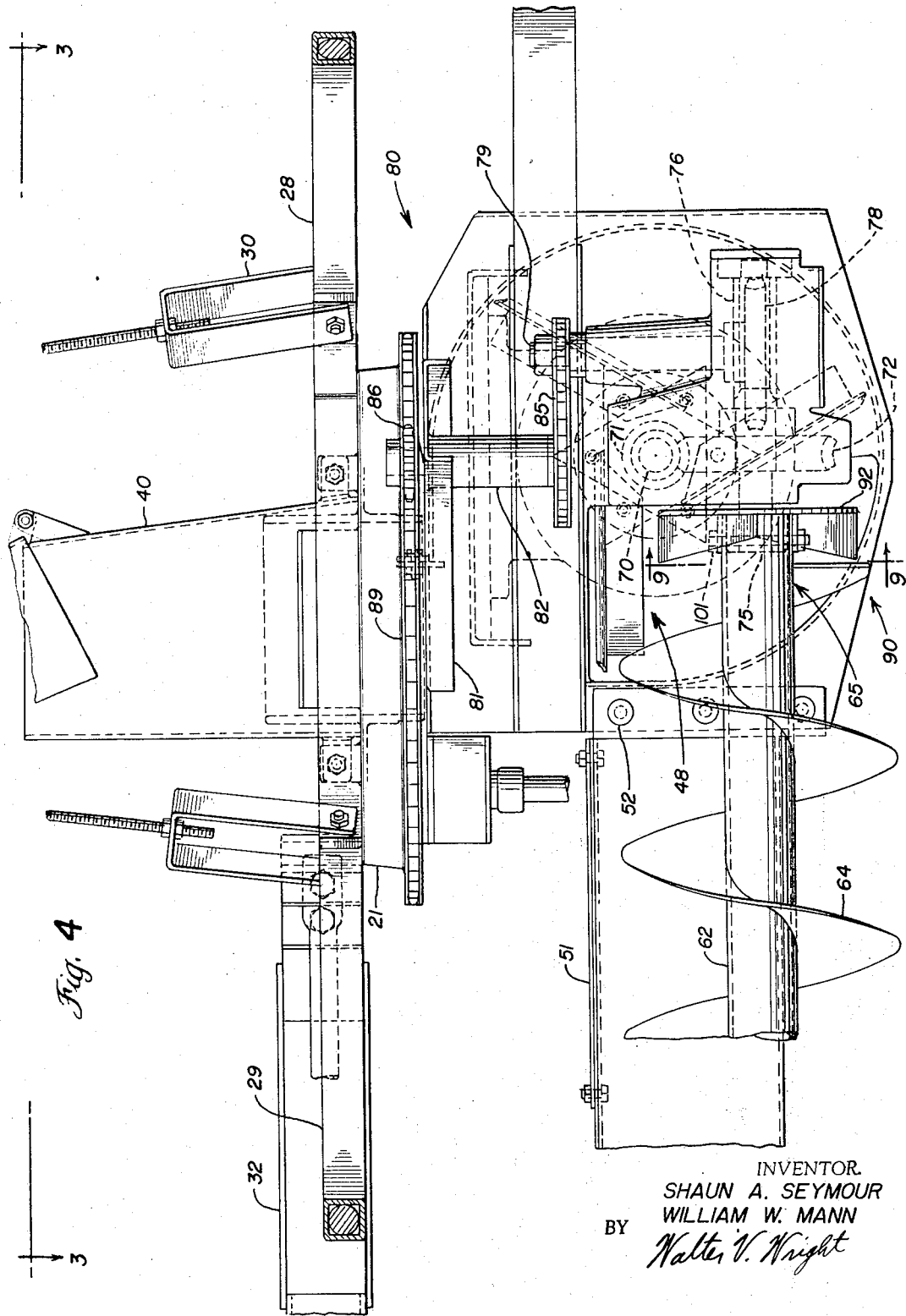

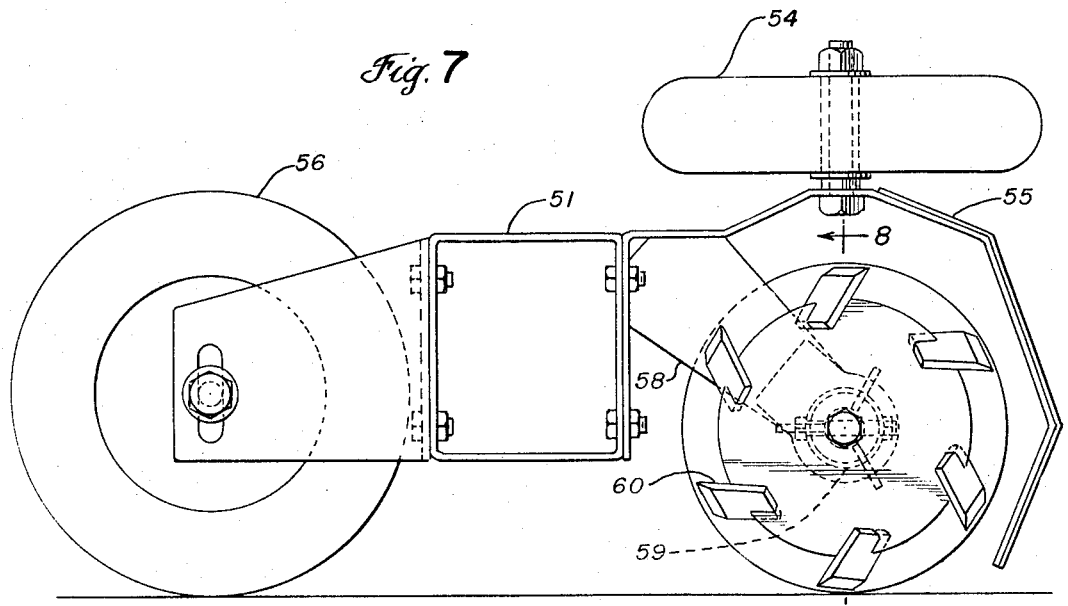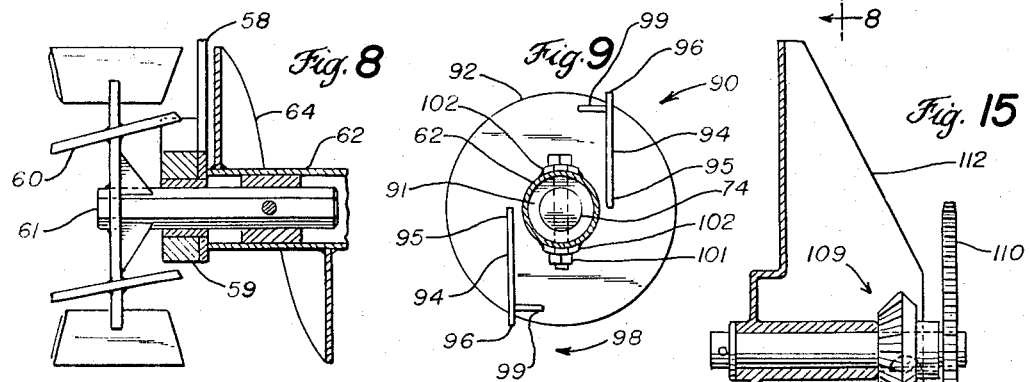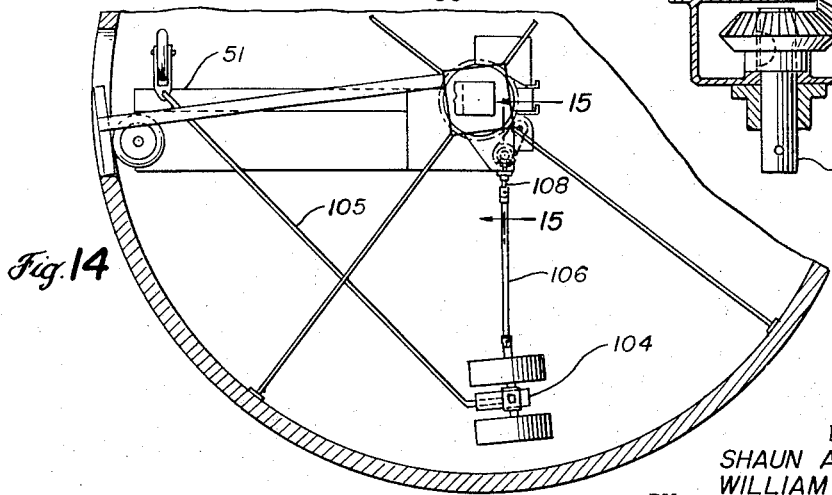

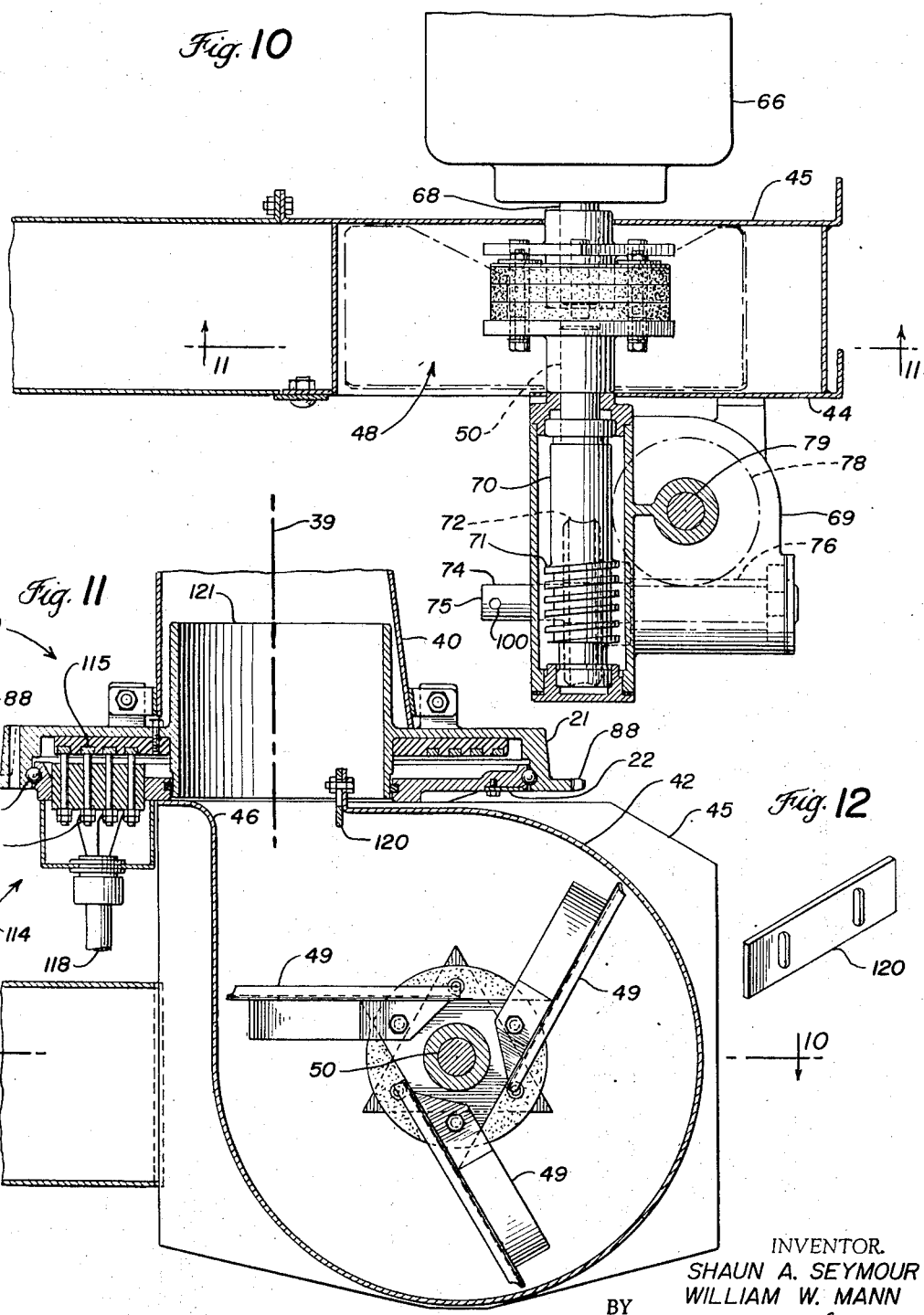

United States Patent Office 3,367,520
Patented Feb. 6, 1968

3,367,520
SILO UNLOADER HAVING FRANGIBLE DRIVE COUPLING

Shaun A. Seymour, Ephrata, and William W. Mann, Talmage, Pa., assignors to Sperry Rand Corporation, New Holland, Pa., a corporation of Delaware
Filed Aug. 24, 1966, Ser. No. 574,591
3 Claims. (Cl. 214—17)

This invention relates generally to silo unloaders. More particularly, it relates to silo unloaders of the type intended to operate on the top surface of material in a silo, as opposed to bottom unloaders which are disposed on the silo floor under the column of silage.

Top silo unloaders usually include as elements of the overall combination, a generally horizontal gathering auger which has one end journalled near the center of the silo. This auger sweeps over the top surface of the silage about its journalled end as it simultaneously rotates about its own shaft, or axis. In this manner, silage is gathered into the center of the silo where other elements such as a blower or impeller receive the material and propel it through a discharge spout directed toward the vertical column of access doors conventionally provided in silos.

Silo unloaders sometimes encounter unusual conditions which overload the mechanism and may effect serious damage thereto in the absence of safety devices which compensate for the unusual conditions. For example, frozen or soft areas in the silage bed can both, under certain conditions, overload the mechanism, at least momentarily. Failure to provide compensating mechanism for such occurrences may result in serious damage to the drive motor or power train of the unloader.

One form of safety device commonly used on farm machinery is the shear bolt. These special bolts are adapted to shear when subjected to a predetermined shear stress, thereby releaving the overload stress on the drive train of the machine. When the overload condition is corrected, a new shear bolt is installed. Thus, shear bolts in the mechanical art may be likened to safety fuses in the electrical arts.

Shear bolts are most effective when employed at, or close to, the location most likely to encounter overload forces. The greater the distance between the shear bolt and the point of overload, the more of the drive train that is subjected to the overload force prior to failure of the shear bolt. In a silo unloader, overloading forces are usually first encountered by the gathering auger. Since the gathering auger, particularly under overload conditions, is often substantially submerged in the silage material, location of a shear bolt at this advantageous location is opposed by the fact that the shear bolt is not accessible for replacement without first digging out the machine to expose the fractured shear bolt.

It is an object of this invention to provide a silo unloader having mechanically simple, low cost drive train overload protection for the gathering auger.

It is another object of this invention to provide overload protection for a silo unloader gathering auger located directly on the auger itself at the output end of the auger drive mechanism.

It is another object of this invention to provide overload protection for a silo unloader gathering auger in the form of a shear bolt coupling which is readily replaceable in the event of a failure.

It is another object of this invention to provide a shear bolt overload protection mechanism at the driven end of a silo unloader gathering auger which automatically clears silage material from the shear bolt area after failure of a shear bolt to facilitate the placement of the bolt.

These and other objects and advantages of this invention will be apparent upon reference to the following description and claims taken in conjunction with the accompanying drawings wherein:

FIG. 2 is a plan view of the silo unloader with the discharge spout removed;

FIG. 4 is a fragmentary side elevational view of the portion of the unloader shown in FIG. 3;

FIG. 7 is an end view of the gathering auger taken as indicated by the line 7—7 of FIG. 2;

FIG. 8 is a detailed sectional view taken on the line 8—8 of FIG. 7;

FIG. 9 is a sectional view at the inboard end of the gathering auger taken on the line 9—9 in FIG. 4 showing the shear bolt mechanism of the present invention;

FIG. 10 is a fragmentary sectional view taken on the line 10—10 of FIG. 11 and showing the drive connection between the motor, impeller and gearbox;

FIG. 11 is a sectional view taken on the line 11—11 of FIG. 10;

FIG. 12 is a detailed view of the passage scraper seen in FIGS. 11 and 3;

FIG. 14 is a semi-diagrammatic view of the unloader showing a surface silage traction wheel embodiment of the gathering means drive; and FIG. 15 is an enlarged detail sectional view of a portion of the drive mechanism shown in FIG. 14 and taken on the line 15—15 of FIG. 14.

Figure 1:
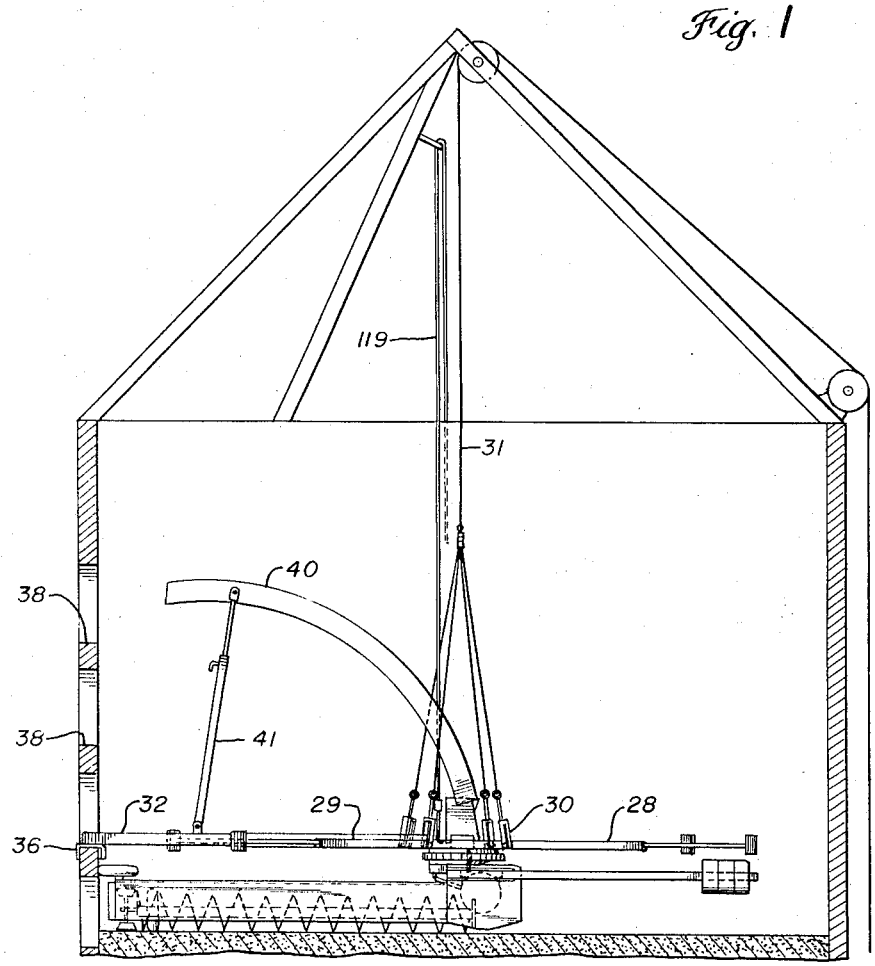
FIG. 1 is a sectional elevation view of the upper portion of a silo showing therein the silo unloader of the present invention semi-diagrammatically.

Referring now to the drawings in detail, the present invention comprises an articulate structure having two major portions: a first, or fixed, portion which is stationary when the unloader is in operation and a second, or revolvable, portion which rotates relatively to the fixed portion when the unloader is operating. The line of division between these two portions may best be understood by first referring to FIG. 11 of the drawings. In FIG. 11 a large diameter journal, indicated generally by the reference numeral 20, is shown in cross section. The upper portion of journal 20, hereinafter known as the first journal means, is indicated by the reference numeral 21. The lower half of journal 20, known as the second journal means, is indicated by the reference numeral 22. These two journal means constitute outer and inner bearing races which carry a series of ball bearings indicated by the reference numeral 24 and seen in phantom lines in FIG. 3 as well as in solid lines in FIG. 11.

Figure 5:
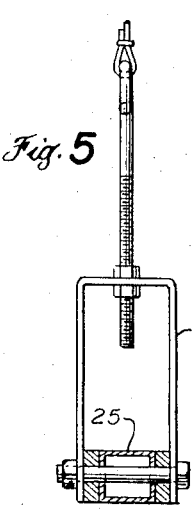
FIGS. 5 and 6 are detailed views of two of the suspension cable mounts.
Figure 6:
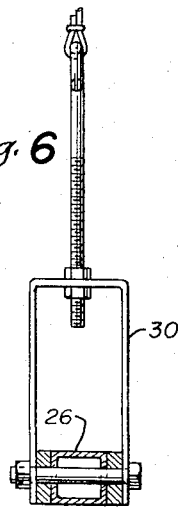
Figure 3:
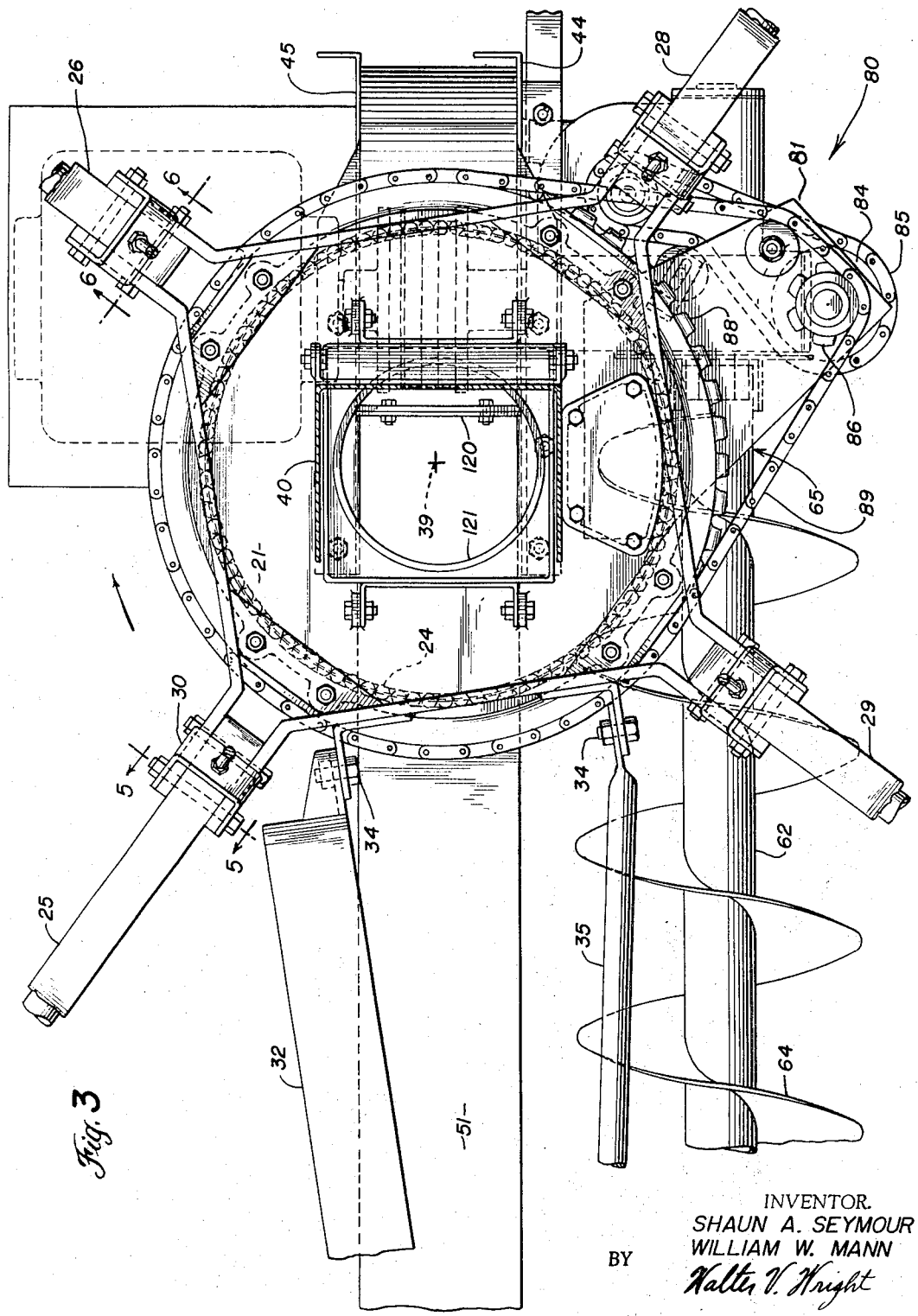
FIG. 3 is a fragmentary enlarged plan view of the central part of the unloader seen in FIG. 2 and taken on the line 3—3 of FIG. 4.

In FIGS. 1–4 it may be seen that four centering arms 25, 26, 28, and 29 are attached to the first journal means 21 to substantially center the journal means in a silo. These arms are spring loaded as will be apparent in FIG. 2 so that they continuously, but yieldably, exert radially outwardly directed force on the silo wall. In FIG. 1, 3, and 4 it may be seen that a number of suspension cable mounting brackets 30 (see FIGS. 5 and 6) are also attached to first journal means 21. Cables extend upwardly from the mounting brackets 30 and merge into a single suspension cable 31 which supports the weight of the silo unloader from the top of the silo, as is well known in the art.

The usual torque arm 32 is attached to first journal means 21 by bolts 34 best seen in FIG. 3. The torque arm assembly includes a diagonal brace 35 and a saddle bracket 36 located at the radially outer end of the torque arm 32. As is customary in the art, the saddle bracket 32 is received over the sill 38 of a silo access door to positively prevent rotation of first journal means 21 about a central axis of rotation 39 which it defines (see FIGS. 3 and 11).

The usual discharge spout 40 is also mounted on first journal means 21 as may be seen in detail in FIGS. 3, 4, and 11. The outer end of discharge spout 40 is directed at one of the silo access doors and is supported by a rod 41 from torque arm 32 (see FIG. 1).

Figure 13:
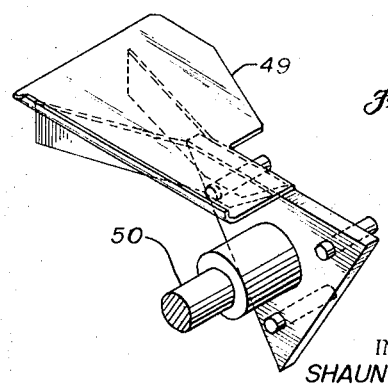
FIG. 13 is an isometric detail view of one of the impeller blades.

In FIG. 11 it may be seen that an impeller housing 42 is attached to the underside of second journal means 22. The impeller housing has planar side plates 44 and 45 (FIG. 10) and a vertical discharge opening 46 (FIG. 11) communication with the discharge spout 40. In FIGS. 4 and 10 it may be seen that the usual material inlet opening 48 is provided in the lower portion of impeller housing side wall 44. A series of rotary impeller blades 49, best seen in FIGS. 11 and 13, are mounted on a central shaft 50 journalled in the side walls 44 and 45 of the impeller housing. The impeller blades are normally driven clockwise as seen in FIG. 11 to sweep upwardly past inlet opening 48 and propel silage material out the vertically discharge opening 46 and through the overlying discharge spout 40.

In FIGS. 3, 4, and 7 a horizontal frame arm 51 of box cross sectional configuration may be seen extending radially outwardly from the impeller housing and attached to the side walls thereof by bolts 52 (FIG. 4). In FIGS. 2 and 7 it will be apparent that the usual thrust reaction wheel 54 is provided at the radially outer end of frame arm 51. The wheel 54 is actually mounted on an auger housing 55 carried by frame arm 51. A support and gaging wheel 56 is also mounted on the radially outer end of frame arm 51 as may be seen in FIGS. 2 and 7.

In FIGS. 7 and 8 it may be seen that a support bracket 58 depends from frame arm 51 and carries at its lower end a journal 59 which supports the radially outer end of a silage gathering auger. In FIGS. 7 and 8, it is also apparent that the usual wall chipper element 60 is provided beyond the outermost end of the gathering auger. The wall chipper 60 includes a stub shaft 61 (FIG. 8) which is received in the journal 59 and mounted within the hollow tubular shaft 62 of the gathering auger. The gathering auger comprises the usual spiral flighting 64 welded, or otherwise fixedly attached, to the hollow auger shaft 62.

In FIG. 2 it will be apparent that the auger shaft 62 extends radially inwardly from the silo wall to an inner end 65 disposed at the silo unloader journal means 20. In FIGS. 3 and 4, it will be apparent that the radially inner end 65 of the gathering augar lies just outside of the impeller inlet opening 48.

Referring now to FIG. 10, along with FIG. 4, it may be seen that an electric motor 66 is disposed outside the impeller housing side wall 45 and has its shaft 68 coaxial with and coupled to impeller shaft 50. A gearbox 69 is mounted outside of impeller housing side wall 44 and has an input shaft 70 which is integrated with impeller shaft 50. Gearbox input shaft 70 has a driving worm 71 formed thereon and meshing with a worm wheel 72. Worm wheel 72 is fixed to a first gearbox output shaft 74 which extends horizontally perpendicular to the input shaft 70 and has a terminal end 75 located in front of impeller housing inlet opening 48. A second driving worm 76 is formed on first output shaft 74 and drivingly engages a second worm wheel 78 which is fixed to a second output shaft 79 which extends vertically upwardly out of the gearbox as may be seen in FIG. 4.

Second gearbox output shaft 79 supplies driving power to a drive train generally indicated by the reference numeral 80 in FIGS. 3 and 4. This drive train includes a gear mounting plate 81 fixedly attached to the second bearing means 22 and journalling a vertical jack shaft 82. A sprocket 84 (FIG. 3) on the lower end of jack shaft 82 is driven by a short endless chain 85 from a sprocket keyed to the upper end of second gearbox output shaft 79. Jack shaft 82 carries at its upper end a small sprocket 86 which is disposed in the horizontal plane of a series of sprocket teeth 88 formed on the outer perimeter of first journal means 21 is prevented from rotating about chain 89 is entrained about the small sprocket 86 and the sprocket teeth 88 on first journal member 21. Since first journal means 21 is prevented from rotating about its axis of rotation 39 by the torque arm assembly 51, when the small sprocket 86 at the upper end of jack shaft 82 is driven from second gearbox output shaft 79, it creeps along the endless chain 89 thereby driving the second journal means, impeller housing, and all the parts mounted thereon about axis 39 relative to first journal means 21.

Referring now primarily to FIGS. 3, 4, 9, and 10, particularly FIGS. 4 and 9, it may be seen that a paddle assembly generally indicated by the reference numeral 90 is received on the terminal end 75 (FIG. 10) of first gearbox output shaft 74. Paddle member 90 is fixed against rotation relative to output shaft 74 in a conventional manner such as welding, splines, or keys. The paddle member 90 comprises a simple hub 91 having a planar disc 92 fixed to one end thereof. A pair of paddle blades 94 are welded or otherwise fixedly attached to the face of disc 92 adjacent gathering auger terminal end 65. The paddle members 94 have radially inner ends 95 (FIG. 9) disposed adjacent to, but spaced from, hub 91 as may be seen in FIG. 9. Paddle members 94 have radially outer ends 96 located at the outer perimeter of the disc 92. It will be apparent from FIG. 9 wherein the direction of rotation of paddle member 90 is indicated by the directional arrow 98 that the radially outer ends 96 of the paddle members 94 are disposed in trailing relation to the radially inner ends 95 of the same members relative to the direction of rotation. Triangular gusset 99 may be employed to strengthen the radially outer ends 96 of the paddle members. These braces are disposed on the trailing face of each of the paddle members and are welded thereto and to the disc 92.

The space between the radially inner ends 95 of the paddle members and the hub 91 affords clearance for the hollow tubular shaft 62 of the gathering auger to be slidably received over hub 91 of the paddle member. As may be seen in FIG. 10, a bolt hole 100 extends diametrically through the gearbox output shaft 74 adjacent the terminal end 75 thereof. Similar bolt holes are provided through the hollow tubular auger shaft 62 and the hub 91 of paddle member 90. These parts are assembled with the bolt holes coaxially aligned to receive a shear bolt 101 therethrough. Reinforcing discs indicated by the reference numeral 102 in FIG. 9 are preferably welded to the outer surface of auger shaft 62 to strengthen the shaft in this area. Naturally, bolt holes are provided through the strengthening discs 102 in coaxial alignment with those in the auger shaft 62.

The paddle member disc 92 acts as a barricade to the movement of silage material axially along the auger as well as providing a mounting surface for the paddle members 94. Material moving axially along the auger is stopped by disc 92 in a predetermined area in front of the inlet opening 48 of the impeller housing.

In operation, the gathering auger delivers material axially therealong into a predetermined area lying outside of the impeller housing and in front of the housing inlet opening 48. The paddle device 90 is located in this area and rotates with gearbox output shaft 74 to continually move material from the predetermined area through the housing inlet opening 48 in front of the impeller paddles 49. The drive coupling between the paddle member 90 and the auger shaft 62 is through shear bolt 101. Thus, it will be seen that should the auger become overloaded and the shear bolt 101 fail, the paddle member generally indicated by the reference numeral 90 will continue to rotate alongwith gearbox output shaft 74 thereby clearing the material in the particular area around the shear bolt 101 from that area into the impeller housing for discharge to the spout 40. The overload force which causes failure of the shear bolt is not transmitted through any of the drive train since it is located directly on the gathering auger; nor is it necessary to dig silage material away from the shear bolt to facilitate replacement. This is accomplished merely by running the silo unloader until no more material is discharged through the spout 40 after failure of a shear bolt.

There are some other elements illustrated in the drawings that play an important part in the overall operation of the silo unloader machine illustrated although they are not directly associated with the claimed subject matter of the present invention. One such element is illustrated in FIGS. 14 and 15 and constitutes a silage surface traction driving wheel assembly 104 which may be employed in place of the chain and sprocket drive 80 to rotate the gathering auger and associated parts about the axis 39. In FIG. 14 it may be seen that the traction driving wheel assembly 104 includes a diagonal brace member 105 connected between the radially outer end of box frame arm 51 and the traction wheel assembly 104. A radially extending drive shaft 106 is interconnected by universal joints between the axle of the drive wheels 104 and a short drive shaft 108 which may also be seen in FIG. 15. Drive shaft 108 is rotated through bevel gearing 109 from a sprocket 110 which replaces sprocket 84 in the previously described drive mechanism 80. This modification is accomplished by substituting the entire bracket assembly 112 of FIG. 15 for the jack shaft mounting plate assembly 81 of the drive system 80.

Another important component of the overall mechanism indicated generally by the reference numeral 114 in FIG. 11. This mechanism involves a plurality of electricity conducting rings 115 fixedly mounted in first journal means 21 and a plurality of electricity conducting brushes 116 which pick up and conduct current from the rings 115 through the electrical conduit 118 to the drive motor 66. Current is supplied to the rings 115 from a source on the ground outside the silo by the usual electrical cable 119 visible in FIG. 1.

A scraper blade 120 is shown in detail in FIG. 12. This blade may also be seen in FIG. 11 and FIG. 3. It is bolted on the impeller housing at the discharge opening thereof and has its ends bearing against an annular sleeve 121 fixedly carried by the first journal means 21. In operation, the sleeve 121 remains stationary along with first journal means 21 while the impeller housing rotates about the axis 39 along with the gathering auger and frame arm 51. The scraper blade 120 is therefore carried around the inner wall of the sleeve 121 and continually scrapes material therefrom to prevent material from building up at the point where it enters the discharge spout and plugging the spout.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. In a silo unloader, the combination comprising an articulate structure having first and second parts, said first part comprising first journal means defining an axis of rotation, means operatively connected to said first journal means for substantially centering the journal means in a silo with said axis of rotation extending generally vertically, means interconnecting said first journal means and the wall of said silo to positively prevent rotation of said first journal means about said axis, a spout on said first journal means extending radially outwardly therefrom, said second part comprising second journal means carried by said first journal means for rotation relative thereto about said axis, an impeller chamber fixed to said second journal means and having a discharge opening communicating with said spout, a rotary impeller in said chamber and having a central shaft, said impeller chamber having a material inlet opening in one side thereof, a motor connected in driving relation to said impeller shaft, a gearbox disposed along said one side of said chamber adjacent said material inlet opening, said gearbox having an input shaft connected in driven relation to said impeller shaft, said gearbox having a horizontal output shaft having a terminal and adjacent said material inlet opening, a paddle unit fixed on said terminal end of said output shaft and disposed to propel material from a predetermined area adjacent said inlet opening through said inlet opening into said impeller chamber upon rotation of said output shaft, a generally horizontal auger extending coaxial with said output shaft to gather and deliver material into said predetermined area, and replaceable frangible means drivingly coupling said auger to said terminal end of said output shaft and adapted to break in response to overload conditions thereby disconnecting the drive to said auger, said frangible means being disposed in said predetermined area whereby upon continued operation of said output shaft, following breakage of said frangible means, said paddle unit clears material from said area to facilitate replacement of said frangible means.

2. In a silo unloader, the combination recited in claim 1 wherein said paddle unit comprises a hub receivable over said terminal end of said gearbox output shaft, means fixing said hub against rotation relative to said shaft, at least one paddle member, means mounting said paddle member on said hub, said auger having a hollow tubular shaft receivable axially over said hub, said gearbox output shaft, said hub, and said auger shaft each having an aperture extending transversely therethrough and disposed in coaxial alignment, and said replaceable frangible means comprising a bolt having a predetermined shear strength extending through said coaxially aligned apertures.

3. In a silo unloader, the combination recited in claim 2 wherein said means mounting said paddle member on said hub comprises a circular disc integrally fixed to said hub and disposed in a plane perpendicular to said gearbox output shaft, said paddle member having a radially inner end adjacent to but spaced from said hub and a radially outer end adjacent the outer periphery of said disc, means fixing said paddle member to the surface of said disc facing said auger with said radially outer end of said paddle member trailing said radially inner end relative to the direction of rotation of said hub.

No references cited.

ROBERT G. SHERIDAN, *Primary Examiner.*